United States Patent Office.

ANDREW L. NOLF AND FRANÇOIS L. A. PIOCHE, OF SAN FRANCISCO, CALIFORNIA

Letters Patent No. 93,899, dated August 17, 1869.

IMPROVED PROCESS OF TREATING ORES WITH COPPER-AMALGAM BY MEANS OF ELECTRIC CURRENTS.

The Schedule referred to in these Letters Patent and making part of the same.

*To all whom it may concern:*

Be it known that we, ANDREW L. NOLF and FRANÇOIS L. A. PIOCHE, of the city and county of San Francisco, State of California, have invented an Improved Electro-Chemical Process for the Treatment of Silver-Ores; and we do hereby declare that the following is a clear and exact description of our process, together with the chemicals or ingredients and agents employed for reducing said ores, and full instructions for putting the same into operation; and we do further assert that the below-described process shall be known as "The Nolf-Pioche Electric Process."

The nature of our invention consists in the simultaneous use of copper-amalgam and electricity for the treatment of silver-ores.

The fire-assay of the ore is first made, in order that the exact amount of pure silver contained in a ton of ore may be ascertained.

Fine precipitated metallic copper, the weight of which, before amalgamation, should be thirty-five (35) per cent. of the weight of the silver contained in the ore under treatment, is then amalgamated with mercury, after which the amalgam, thus formed, is well mixed with the dry pulverized ore.

The best way to obtain a perfect mixture, is to put the dry ore and copper-amalgam together in a cast-iron or wooden barrel, to which a rapid motion is given, and after about ten minutes, the copper-amalgam will be well divided in small particles throughout the entire mass.

The ore is then placed in a vat, which is provided with a metallic copper bottom, and salt water (concentrated) is added, little by little, without moving the ore, until the ore is covered with the water to the height of from five (5) to six (6) inches.

An iron plate is then placed in the vat, in such a manner as to be entirely submerged in the salt water, but resting some two or three inches above the surface of the ore.

Electricity, produced by an ordinary galvanic battery, is then applied, the positive pole connecting with the top iron plate in the vat above the ore, and the negative pole with the copper plate at the bottom.

In working ores on a large scale, the use of a galvanic battery can be dispensed with, as a powerful electric current can be obtained by forming an electric circuit through the vats, a great number being used. In this case, the iron plate of the first vat is connected with the copper plate of the second vat, and so on, until the last iron plate connects with the copper plate of the first vat.

After twelve (12) hours of electric influence, the operation is finished, from eighty (80) to ninety (90) per cent. of the silver is amalgamated, and the ore is ready to be washed by any means.

The silver-amalgam obtained by this process is always very pure, because a part of the copper, which was put in the mercury at the beginning of the operation, has passed into the state of chloride of copper, while another part combines itself with the sulphur of the previous sulphuret of silver.

Tin, lead, or zinc-amalgam could be used instead of copper-amalgam, but under the influence of electricity, the affinity of copper for sulphur being greater than any other metal, copper-amalgam will always give better results.

If the silver-ores to be treated are very rebellious, sulphate of copper ought to be added in the vats at the beginning of the operation, but a great many kinds of ores can be treated without using that chemical.

In any case, and for any ores, the operation is more perfect and more rapid if the vats containing the ores are placed in large boxes, in which a current of steam is well distributed. Principally in cold countries, the use of steam is indispensable, in order to obtain good results.

The object of tin, lead, zinc, or copper-amalgam is to prevent the mercury from losing its metallic form, by entering into combination with chlorine, sulphur, or other substance.

Theory says that mercury, alone, in contact with the negative pole of the vats, will not lose its metallic form, but the results of many experiments prove that in practice it is, when mixed with silver-ores, partly changed, by entering into combination, even when in constant contact with the negative pole of a battery.

The entering of this metal into combination is entirely prevented, even in the most rebellious ores, by the use of copper-amalgam.

Having thus described our invention,

What we claim, and desire to secure by Letters Patent, is—

The simultaneous application of electricity and copper-amalgam, for the decomposition of silver-ores, substantially as and in the manner as herein specified.

In witness whereof, we have hereunto set our hands and seals.

A. L. NOLF. [L. S.]
F. L. A. PIOCHE. [L. S.]

Witnesses:
JOHN L. BOONE,
WM. GERLACH.